Charles A Willard
INVENTOR
BY Victor J. Evans & Co.
ATTORNEY

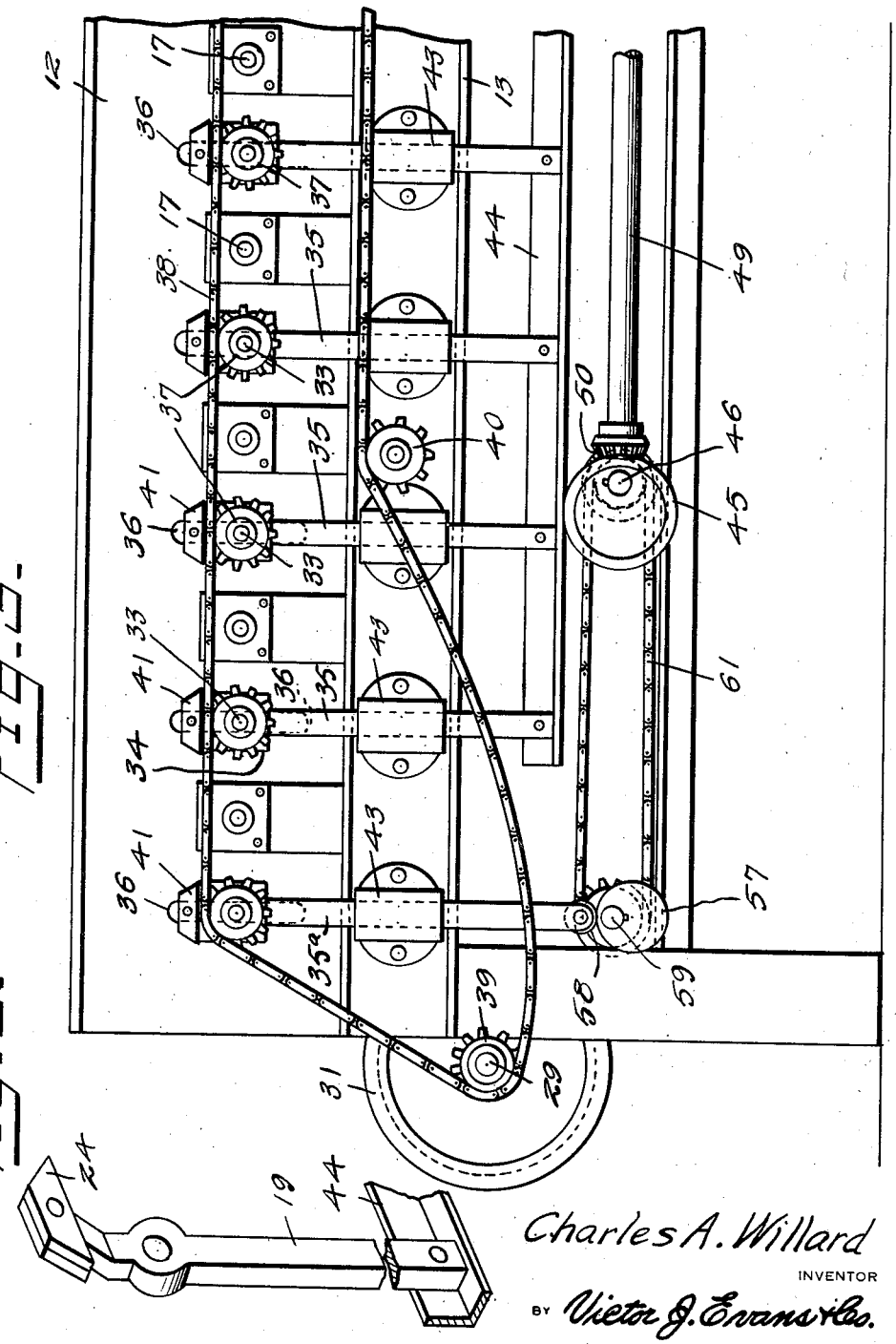

Nov. 12, 1940.                C. A. WILLARD                2,221,159
                          FRUIT CLEANING MACHINE
                          Filed Aug. 23, 1937          6 Sheets-Sheet 5
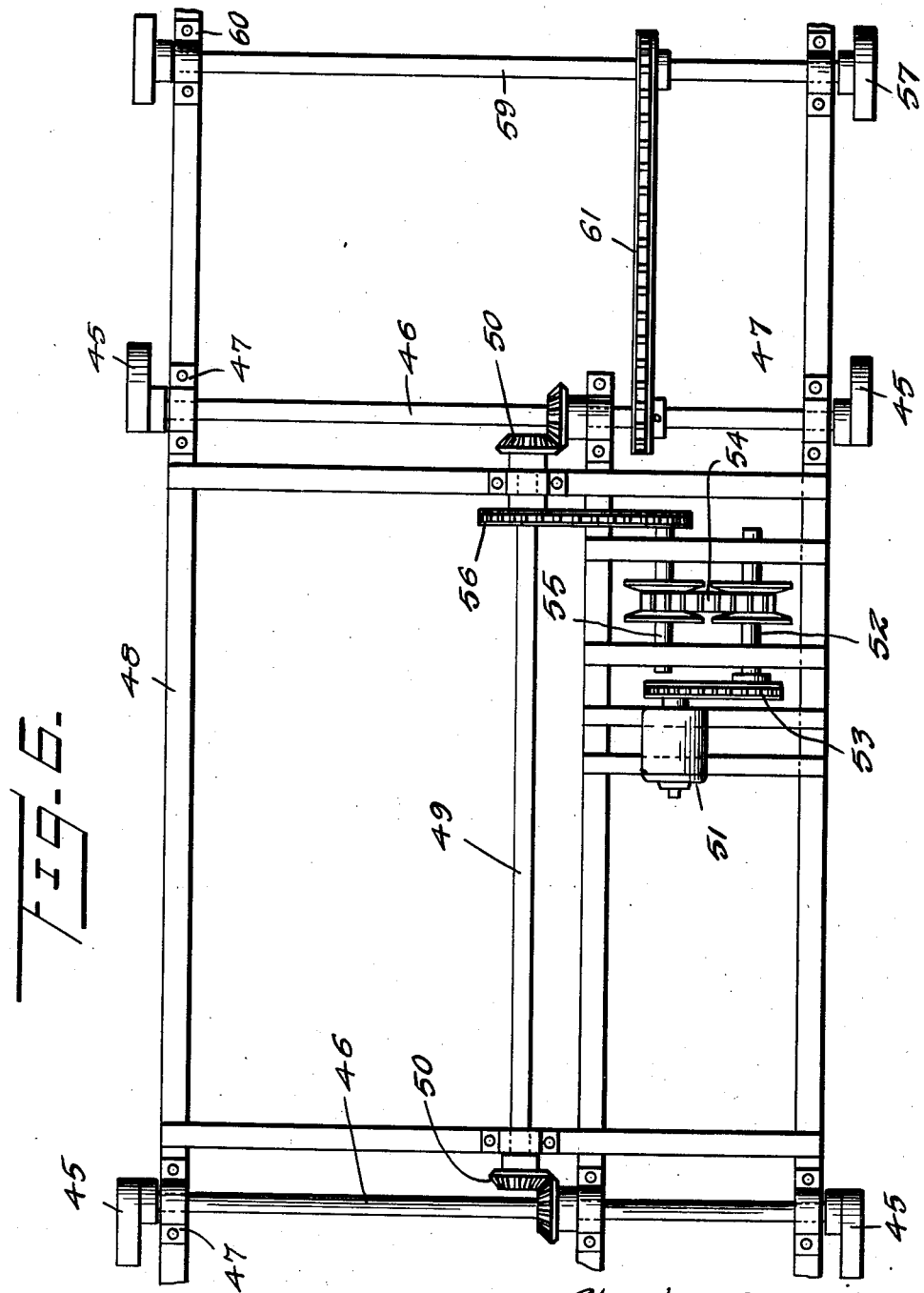
Charles A. Willard
INVENTOR
BY Victor J. Evans & Co.
ATTORNEYS

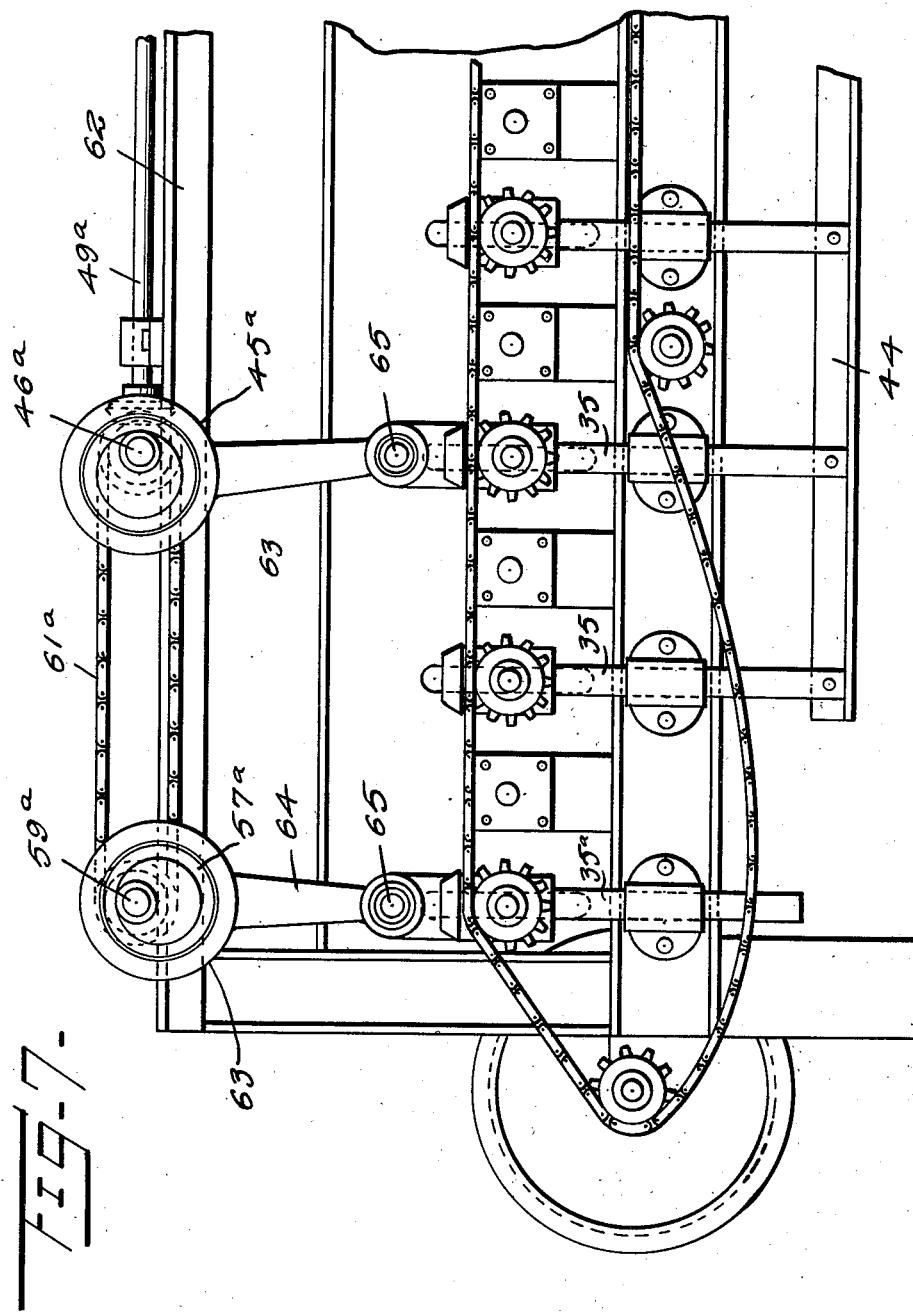

Patented Nov. 12, 1940

2,221,159

UNITED STATES PATENT OFFICE 2,221,159

FRUIT CLEANING MACHINE

Charles A. Willard, Orlando, Fla., assignor to Fruit Treating Corporation, Orlando, Fla., a corporation of Florida Application August 23, 1937, Serial No. 160,526

3 Claims. (Cl. 146—202)

The object of the invention is to provide an apparatus to which fruit, after picking, may be delivered at a moderate rate and subjected to an agitating and wiping action whereby all refuse or foreign matter may be eradicated from the surface; to provide a fruit cleaning machine in which the bed consists of a series of rotary wiping members of which the axes of rotation of successive members progressively change, so that the fruit is advanced through the machine by the wiping or brushing members; and generally to provide a machine of the kind indicated which is of comparatively simple construction for the functions to be performed and thus susceptible of comparatively cheap manufacture.

With this object in view, the invention consists in a construction and combination of parts of which a preferred embodiment is illustrated in the accompanying drawings but to which the invention is not to be restricted. Practical application may dictate certain changes or alternations and the right is claimed to make any which fall within the spirit of the invention.

In the drawings:

Figure 5 is an elevational view at the delivery end but showing the reverse side from that illustrated in Figure 1.

Figure 6 is a plan view of the frame-work below the bed of the machine.

Figure 7 is a view similar to Figure 5 but showing a modified form of actuating the bodily movable cleaning members.

Figure 8 is a detail perspective view of one of the movable brush posts.

Figure 1:
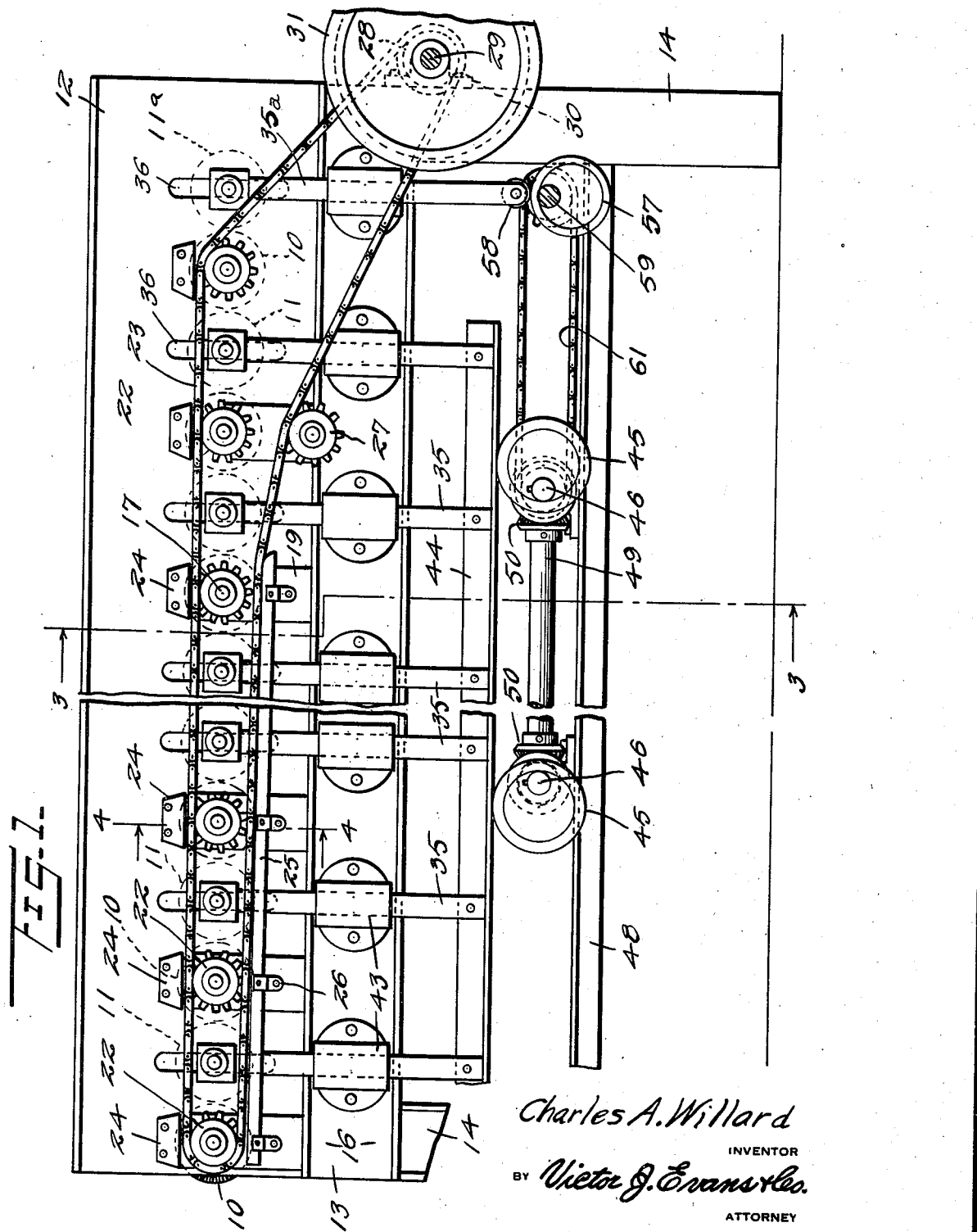
Figure 1 is a side elevational view of the invention.
Figure 2:
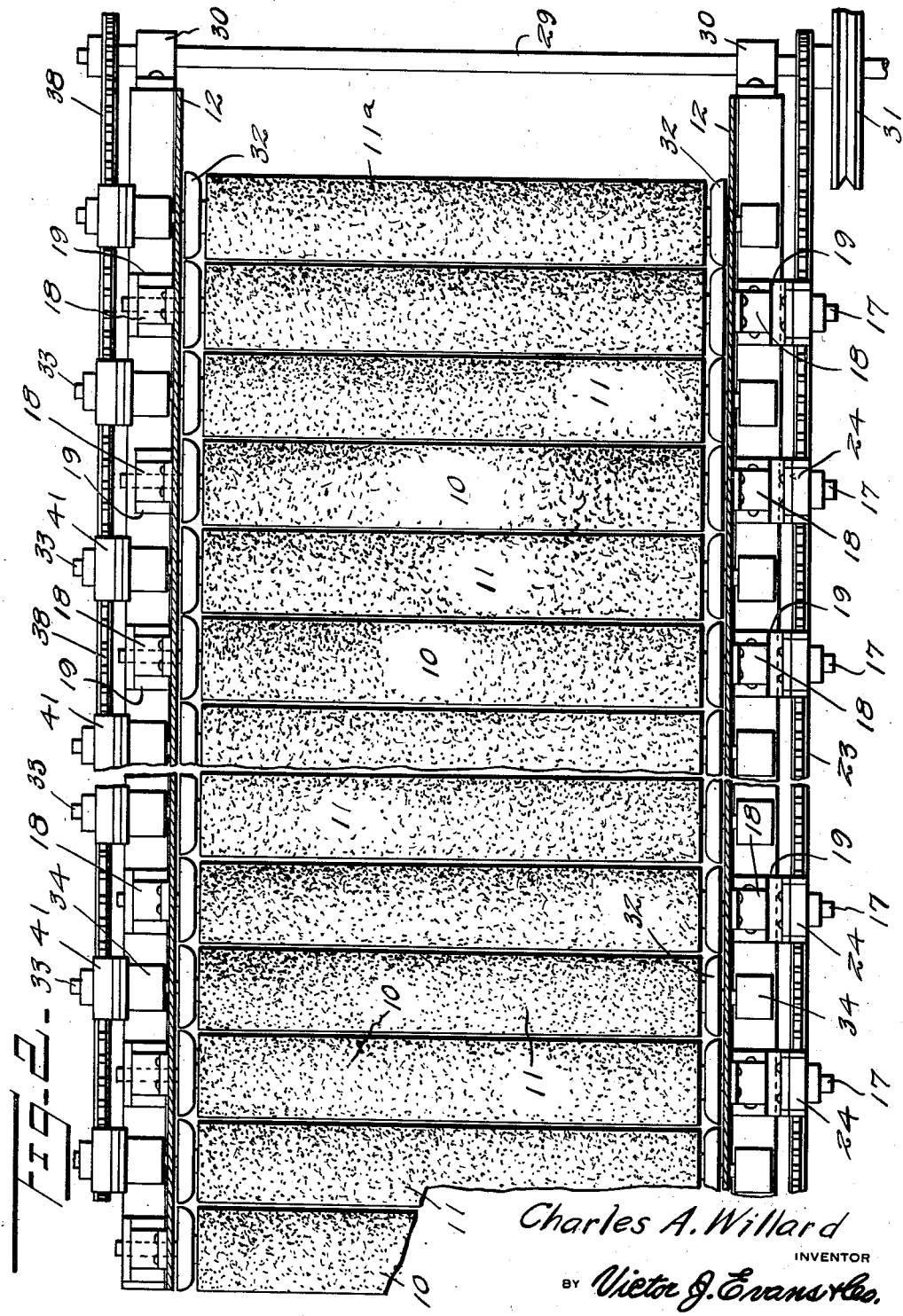
Figure 2 is a top plan view.
Figure 3:
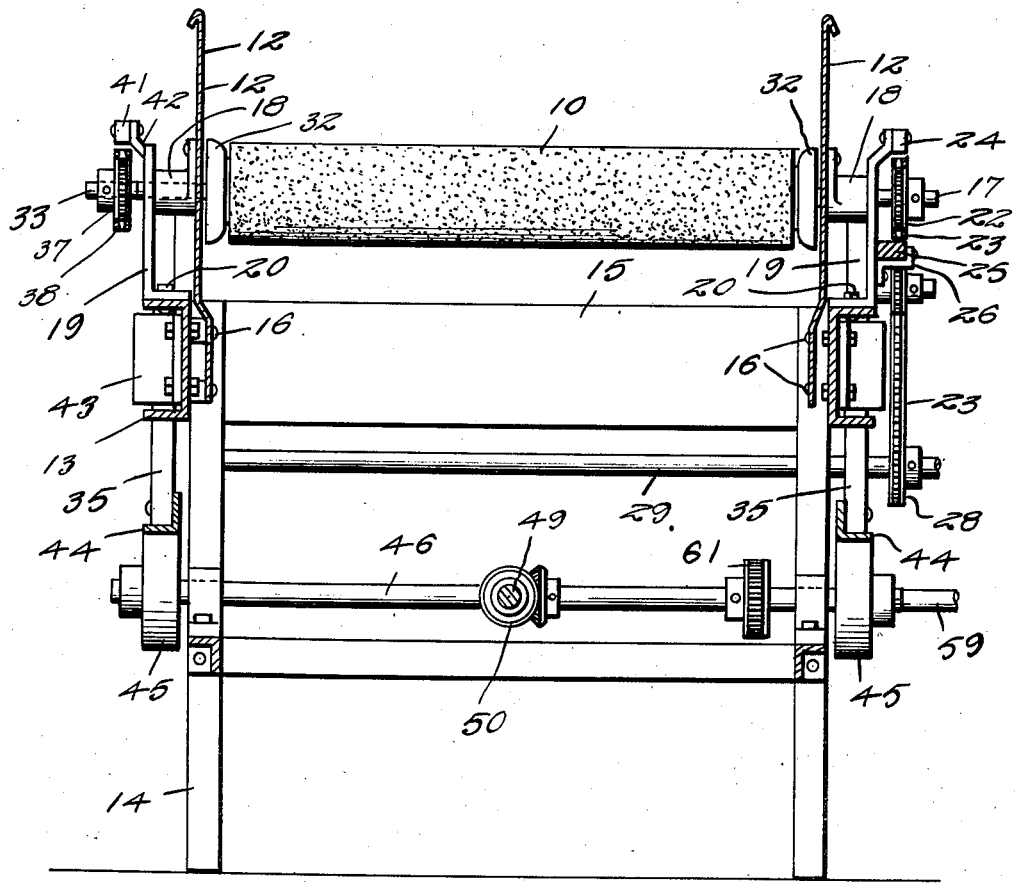
Figure 3 is a sectional view on the plane indicated by the line 3—3 of Figure 1.
Figure 4:
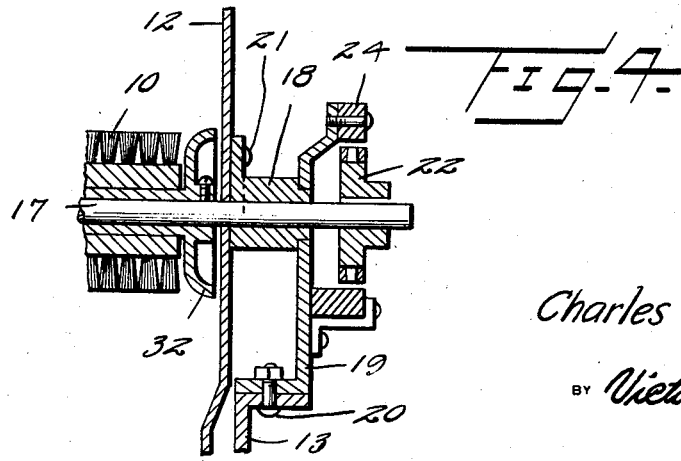
Figure 4 is a sectional view on the plane indicated by the line 4—4 of Figure 1.

The fruit cleaning function is carried out by the invention by delivering fruit at one end of a bed composed of a series of rotary brushes 10 and 11 shielded at the ends by guard plates 12. The brushes 10 rotate on fixed axes while the brushes 11 which are arranged in intercurrent relation with the brushes 10 rotate on axes which constantly move up and down in vertical planes, so that the bed thereby is in the form of successive ridges and hollows of which the brushes 10 at one instant are at the peaks of the ridges and at the next instant at the bottom of the hollows because of the fact that axes of the rolls 11 rise above the plane of the axes of the rolls 10 and drop below the axes of such rolls.

The bed of brushes is carried by the side rails 13 supported on standards 14 connected at their ends by cross rails 15. The side rails 13 are preferably in the form of channels of which the flanges are directed outwardly and the guard plates 12 which extend below the plane of the brushes are secured to the side rails as by rivets 16.

The brushes 10 are carried by shafts 17 and these shafts are journaled in bearings 18 on opposite sides of the machine, the bearings being carried by bracket members 19 which are secured to the rails 13 by means of bolts 20. While the brackets 19 function as supports for the bearings 18, the latter are connected, as by means of rivets or other fasteners 21, with the guard plates 12.

At one side of the machine, the shafts 17 are extended far enough to receive the sprockets 22 over which is trained the chain 23 by means of which rotary movement is imparted to the brushes 10. The upper run of the chain only is in engagement with all of the sprockets 22 and is kept in such engagement by means of shoes 24 which are mounted at the upper ends of the brackets 19 where they overhang the chain just above the sprockets.

The lower run of the chain engages the sprockets at the undersides at the intake end of the machine and lies upon a long shoe 25 supported by small brackets 26 of which one is carried by each of the main brackets 19 spanned by the shoe 25. Beyond the shoe 19, the lower run of the chain passes over an idle sprocket 27 mounted on one of the brackets 19 and thence around a sprocket 28 mounted on the main shaft 29, the latter being journaled in bearings 30 on two of the standards or legs 14.

A drive pulley 31 constitutes the means by which rotation may be imparted to the shaft 29 and rotation of the latter will obviously, by reason of the chain drive just described, effect rotation of the brush shafts 17 and with them the brushes 10.

Rounded shield members 32 are disposed at the end of each brush to rotate with the latter, these shield members being bell shaped to have their edges lie close to the guard plates 12, and they thus provide means to preclude fruit being caught between the ends of the brushes and the guard plates.

The brushes 11 which, besides rotating, are reciprocated in vertical planes have their shafts 33 journaled in bearings 34 which are carried by the posts 35, the terminal brush 11a having its bearings carried by posts 35a. Since the rolls 11 reciprocate, clearance slots 36 are formed in the guard plates 12 for the shafts 33 and the shafts at one side of the machine are extended so that they may receive the driving sprockets 37, these being disposed on the opposite side of the machine from the sprockets 22. Over the sprockets 37 is trained a drive chain 38, this chain being also trained over the sprocket 39 and idle sprocket 40, the former sprocket being carried by the shaft 29 at the end remote from the sprocket 28 and the latter being rotatably mounted on one of the side rails 13. Shoes 41 carried at the upper ends of the posts 35 and 35a are mounted on brackets 42 secured in any appropriate manner to certain of the bearings 34 and these shoes overhang the chain 38 and keep its upper run in engagement with the sprockets 37.

The posts 35 and 35a, in order to secure the vertical reciprocatory movement of the brushes 11, are mounted in slide bearings 43 and all of the posts on each side of the machine are interconnected by a tie bar 44, the connections between the posts and the tie bars being rigid so that the whole system of posts will move as one unit. The tie bar 44 is preferably angular to have its horizontal flange engaged by eccentrics 45 of which there are two on each side of the machine positioned adjacent the ends of each tie bar 44. The eccentrics are synchronized so that the tie bars in their vertical movement are always horizontally disposed. Thus the several brushes 11, except the terminal brush, lie always in a common plane despite their up and down movement.

The eccentrics 45 are arranged in pairs of which the units are mounted at the extremities of the shafts 46, the latter being journaled in bearings 47 mounted on the framework 48 carried by and connecting the standards 14. The shafts 46 being remotely positioned, are interconnected for simultaneous operation by a shaft 49 and miter gear couples 50, the shafts 46 being driven from the shaft 49 to which movement is imparted from a motor 51 carried on the framework 48 and operatively connected with a shaft 52 by means of a drive chain 53. A chain belt 54 operatively connects the shaft 52 with a shaft 55 and the latter, by means of a chain 56, is operatively connected with the shaft 49.

While the eccentrics 45 on the remote shafts 46 are timed to have their corresponding points always in the same horizontal plane, they are nevertheless angularly displaced 180°, so that any tendency of one pair of eccentrics to move the tie bar in one direction is offset by the other pair of eccentrics to move it in the opposite direction. Thus, in the raising and lowering of the brushes 11, there is no tendency to move them laterally with consequent side wear on the bearings 43 that would result were the eccentrics not displaced as shown.

The terminal brush 11a, while moved in timed relation with the brushes 11, is nevertheless operated out of phase with the latter. That is, it is independently operated by reason of having its standards 35a actuated by eccentrics 57, the standards 35a being provided with rollers 58 at their lower ends which traverse the peripheries of the eccentrics 57. The eccentrics 57 are carried upon and rotated by a shaft 59 journaled in bearings 60 on the framework 48 and movement is imparted to this shaft through the instrumentality of a chain 61 which operatively connects it with one of the shafts 46. By having the brush 11a independently reciprocated, its degree of vertical movement can be varied by changing the eccentrics 57 for others of a different throw and the rate of reciprocation of the brushes may be changed by varying the ratio of rotation obtaining between the shafts 46 and 59. The terminal brush may thus be used as a means to retain the fruit on the bed at the discharge end to have more or less an accumulation of the same thereat before discharge. This constitutes a precautionary step in the cleaning operation before final discharge of the fruit.

In the modification shown in Figure 7, reciprocation of the brushes 11 and 11a is effected from above the plane of the brushes, as by providing a superficial framework 62 on which the shafts 49a, 46a and 59a are rotatably mounted, these shafts functioning in the same way as their equivalents mounted on the frame 46, the chain 61a operatively connecting the shafts 46a and 59a being the equivalent of the chain 61. The eccentrics 46a and 57a, however, are surrounded by straps 63, these straps having the connecting rods 64 of which that associated with the eccentric 57a is connected by means of a wrist pin 65 with the posts 35a and that associated with the eccentric 45a similarly connected by means of a wrist pin with one of the posts 35. All of the posts 35 are interconnected by the tie bars 44 as in the hereinbefore described construction but the vertical movement of the assemblage of brushes is secured by the eccentrics imparting a pull to certain of the posts 35 as distinguished from a lift given to them by wiping movement on the tie bars 44.

The bed of brushes has the separate brushes so closely related that they are practically tangent when in a common plane and when fruit is deposited for cleaning and the brushes set in rotation with the brushes 11 reciprocated as above described, the fruit is tumbled from one brush to the other and at the same time is rotated promiscuously so that all points are brought into contact with the brushes and it is thereby effectively cleaned. The brushes 11 rising above and dropping below the plane of the brushes 10 results in the fruit passing over a series of rises and down through a series of hollows. The direction of rotation of the brushes on their own axes is preferably right-handedly as viewed in Figure 1, so that the tendency of the initial brush 10 is to pass the fruit toward the next adjacent brush 11 against which it will be rotated until that brush drops below the plane of the brush 10, when the fruit will drop onto the brush 11 and thereby be advanced toward the next brush 10 onto which it will pass when the first brush 11 has risen above the plane of the second brush 10. Thus the fruit will be passed along the whole series of brushes until it reaches the final brush 11a over which it will be discharged into appropriate receiving means after that brush shall have dropped to the plane of its adjacent brush 10. The bodily movement of the brush 11a is from the plane of the brushes 10 to a point above said brushes, the brush 11a never dropping below the plane of the brushes 10. Its out of phase movement with respect to the brushes 11 provides for retarding the discharge of the fruit at the discharge end until, as stated above, there shall be more or less an accumulation of the same and the final, additional and precautionary wiping prior to discharge.

The invention having been described, what is claimed as new and useful is:

1. A fruit treating machine comprising a bed of rotary brushes of which alternate brushes turn on fixed axes and intervening brushes on vertically movable axes, means for rotating all of said brushes, means for bodily reciprocating the said intervening brushes laterally of their axes, a terminal brush bodily movable in timed relation to the movable brushes but out of phase with the latter, means to vertically adjust said terminal brush and operative connections between said latter brush and said reciprocating means.

2. A fruit treating machine comprising a bed of rotary brushes of which alternate brushes turn on fixed axes, vertically reciprocal posts on which the intervening brushes are mounted for bodily movement laterally of their axes from points below to points above the plane of the remaining brushes, tie bars connecting said posts, eccentrics engaging said tie bars, means for rotating all of the brushes, means for rotating said eccentrics, a terminal brush bodily movable in timed relation to the intervening brushes but out of phase with the latter, means to vertically adjust said terminal brush and operative connections between said latter brush and said reciprocating means.

3. A fruit treating machine comprising a frame having side members, a plurality of brushes rotatably mounted on fixed supports attached to said side members, the axes of said brushes being parallel and in substantially the same plane, a plurality of brushes interposed between the first brushes, said interposed brushes being mounted upon vertically movable supports attached to opposite sides of the frame with their axes in substantially the same plane, the circumferences of successive brushes being spaced apart a distance less than the diameter of the fruit being treated, means for rotating all of the brushes in the same direction, means for reciprocating said movable supports a sufficient extent to move the fruit from one brush to the other transversely of their axes, whereby alternate intervening brushes are bodily reciprocated from points below to points above the plane of the remaining brushes, a terminal brush bodily movable in timed relation to the intervening brushes but out of phase with the latter, means to vertically adjust said terminal brush and operative connections between said latter brush and said reciprocating means.

CHARLES A. WILLARD.